US008400747B2

(12) United States Patent
Ichiki et al.

(10) Patent No.: US 8,400,747 B2
(45) Date of Patent: Mar. 19, 2013

(54) SUPERCONDUCTING COIL, SUPERCONDUCTING MAGNET, AND METHOD OF OPERATING SUPERCONDUCTING MAGNET

(75) Inventors: Yota Ichiki, Hitachinaka (JP); Tsuyoshi Wakuda, Hitachinaka (JP); Minseok Park, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 90 days.

(21) Appl. No.: 13/181,578

(22) Filed: Jul. 13, 2011

(65) Prior Publication Data

US 2012/0014030 A1 Jan. 19, 2012

(30) Foreign Application Priority Data

Jul. 14, 2010 (JP) ................................ 2010-159382

(51) Int. Cl.
*H02H 7/00* (2006.01)

(52) U.S. Cl. ........................................ 361/141; 361/19

(58) Field of Classification Search .................... 361/19, 361/141

See application file for complete search history.

(56) References Cited

U.S. PATENT DOCUMENTS 4,727,346 A * 2/1988 Westphal et al. ............ 335/216
5,225,957 A * 7/1993 Tsurunaga ...................... 361/19
6,958,608 B2 * 10/2005 Takagi et al. ................ 324/318

FOREIGN PATENT DOCUMENTS

JP 61-074308 4/1986
JP 2007-234689 9/2007

OTHER PUBLICATIONS

U.S. Appl. No. 13/034,668, filed Feb. 24, 2011, Ichiki, et al.

* cited by examiner

*Primary Examiner* — Danny Nguyen
(74) *Attorney, Agent, or Firm* — Antonelli, Terry, Stout & Kraus, LLP.

(57) ABSTRACT

In a superconducting coil, a parallel conductor includes a plurality of superconducting wires bundled and wound in a coil. The superconducting wires have at least two connections therebetween. A current source connected to the superconducting wires to form a loop via the superconducting wires and the connection to supply a current in the loop when a quench is detected. A superconducting magnet includes the superconducting coil, a persistent current switch connected to the superconducting coil, and a quench detector configured to detect quench occurring in the superconducting coil.

12 Claims, 6 Drawing Sheets

SUPERCONDUCTING COIL, SUPERCONDUCTING MAGNET, AND METHOD OF OPERATING SUPERCONDUCTING MAGNET

CROSS REFERENCE TO RELATED APPLICATION

This application claims the foreign priority benefit under Title 35, United States Code, §119(a)-(d) of Japanese Patent Application No. 2010-159382, filed on Jul. 14, 2010 in the Japan Patent Office, the disclosure of which is herein incorporated by reference in its entirety.

BACKGROUND OF THE INVENTION

1. Field of the Invention

The present invention relates to a superconducting coil, a superconducting magnet, and a method of operating the superconducting magnet and particularly to quench protection for a superconducting coil in a superconducting magnet operated in a persistent mode.

2. Description of the Related Art

Because a superconducting magnet used in an MRI (Magnetic Resonance Imaging) apparatus, an NMR (Nuclear Magnetic Resonance) or the like generally require a high intensity magnetic field, a magnetic energy ($LI^2/2$, where L is an inductance and I is driving current) stored in the coil of a superconducting magnet becomes large.

Accordingly, the superconducting coil requires a protection technology for preventing the superconducting coil from burning due to local Joule heating when quench (transition from a superconducting state to a normal state) occurs in the superconducting coil.

As the quench protection, a method of consuming energy in a protection resistor connected in parallel to the superconducting coil is known.

In this method, because when the superconducting coil is driven by a current supplied from a power source in a driven mode, it is possible to conduct the current through the protection resistor forcibly by cutting off the power source, this method is efficient as quench protection.

However, in a persistent mode continuing the current flow through a closed circuit including the superconducting coil and a persistent current switch, the circuit cannot be forcibly opened. This method only divides the current into the protection resistor by the resistance generated by quench (see FIG. 7 of JP 61-74308).

Therefore, it is important to increase the resistance generated when the quench, i.e., when the quench occurs, it is important to rapidly spread the quench area (normal conducting region) over the whole of the coil.

In addition, various methods of quench protection have been developed.

JP 61-74308 discloses a protection method of connecting a diode in parallel to the superconducting coil instead of the protection resistor to suppress a current flowing through a protection circuit when excitation is cut off using the switching voltage.

In JP 2007-234689 discloses a method of protecting the superconducting coil in a case where a plurality of superconducting coils are connected in series. In the method, a protecting circuit is configured with a diode and a heater. When quench occurs, a current flows through the heater by a potential difference due to the quench to induce quench in all superconducting coils.

Quench protection technologies for superconducting magnets (superconducting coils) using low temperature superconducting wires such as a niobium-titanium alloy (NbTi) are known. On the other hand, the quench protection becomes more difficult in superconducting magnets (superconducting coils) using a high temperature superconducting wire including, for example, a magnesium diboride ($MgB_2$) than the case using the low temperature superconducting wire.

On the other hand, because the high temperature superconductor has a higher critical temperature, it is possible to make a difference between an operation temperature and the critical temperature larger. In addition, because the higher the temperature of the high temperature superconductor, the larger specific heat the high temperature superconductor has, the high temperature superconductor has a merit in that it is not easy for quench to occur.

However, when the quench occurs in the superconducting coil due to a power fail or a trouble in a refrigerator, this advantage turned to be a demerit.

More specifically, the fact that the quench hardly occurs because there is a large difference between the operation temperature and the critical temperature and the specific heat is large corresponds to a result that the quench hardly spread because there is the large difference between the operation temperature and the critical temperature and the specific heat is large when the quench locally occurs. When an area where the quench occurs is narrow, a temperature of the area rapidly increases because the energy in the superconducting coil is locally consumed. Accordingly, the temperature may instantaneously exceed a burning temperature.

In addition, as described in JP 2007-234689, even if the method of accelerating spreading of quench with the heater is used, there is a possibility of burning before the quench is sufficiently spread in consideration of time necessary for quench detection, heating and temperature increase with the heater. Particularly, the high temperature superconductor has a larger difference in temperature between the operation temperature and the critical temperature and has a larger specific heat than the low temperature superconductor, so that it takes for a long period to increase the temperature of the superconducting coil from the operation temperature above the critical temperature. During this, risk to burning of the superconducting coil is high.

SUMMARY OF THE INVENTION

The present invention may provide a superconducting coil, a superconducting magnet, and a method of operating the superconducting magnet, capable of preventing the superconducting coil from burning due to a local temperature increase when quench occurs in the superconducting magnet being operated in a persistent mode.

A first aspect of the present invention provides a superconducting coil comprising:

a plurality of superconducting wires bundled as a parallel conductor and wound in a coil, the superconducting wires having at least two connections therebetween for parallel connection; and a current source connected to intermediate points of the superconducting wires to have loops via the superconducting wires and the connections to supply current in the loops when a quench is detected.

A second aspect of the present invention provides a superconducting magnet including the superconducting coil based on the first aspect, comprising:

a persistent current switch connected to the superconducting coil; and a quench detector configured to detect quench occurring in the superconducting coil.

A third aspect of the present invention provides a method of operating a superconducting magnet comprising:

the superconducting coil based on the second aspect;

a persistent current switch connected to the superconducting coil; and a quench detector configured to detect quench occurring in the superconducting coil, the method comprising:

charging the capacitor in a steady condition; and discharging the capacitor to supply a discharge current to the superconducting coil when the quench is detected.

According to the present invention, in the superconducting magnet being operated in the persistent mode, when the quench occurs, a superconducting coil, a superconducting magnet, or a method of operating the superconducting magnet can prevent the superconducting coil from burning due to the local temperature increase.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinafter with reference to drawings will be described first to third embodiments of the present invention. The same elements or parts in respective drawings are designated with the same references and thus a duplicated description will be omitted.

<Superconducting Magnet>

Figure 1:
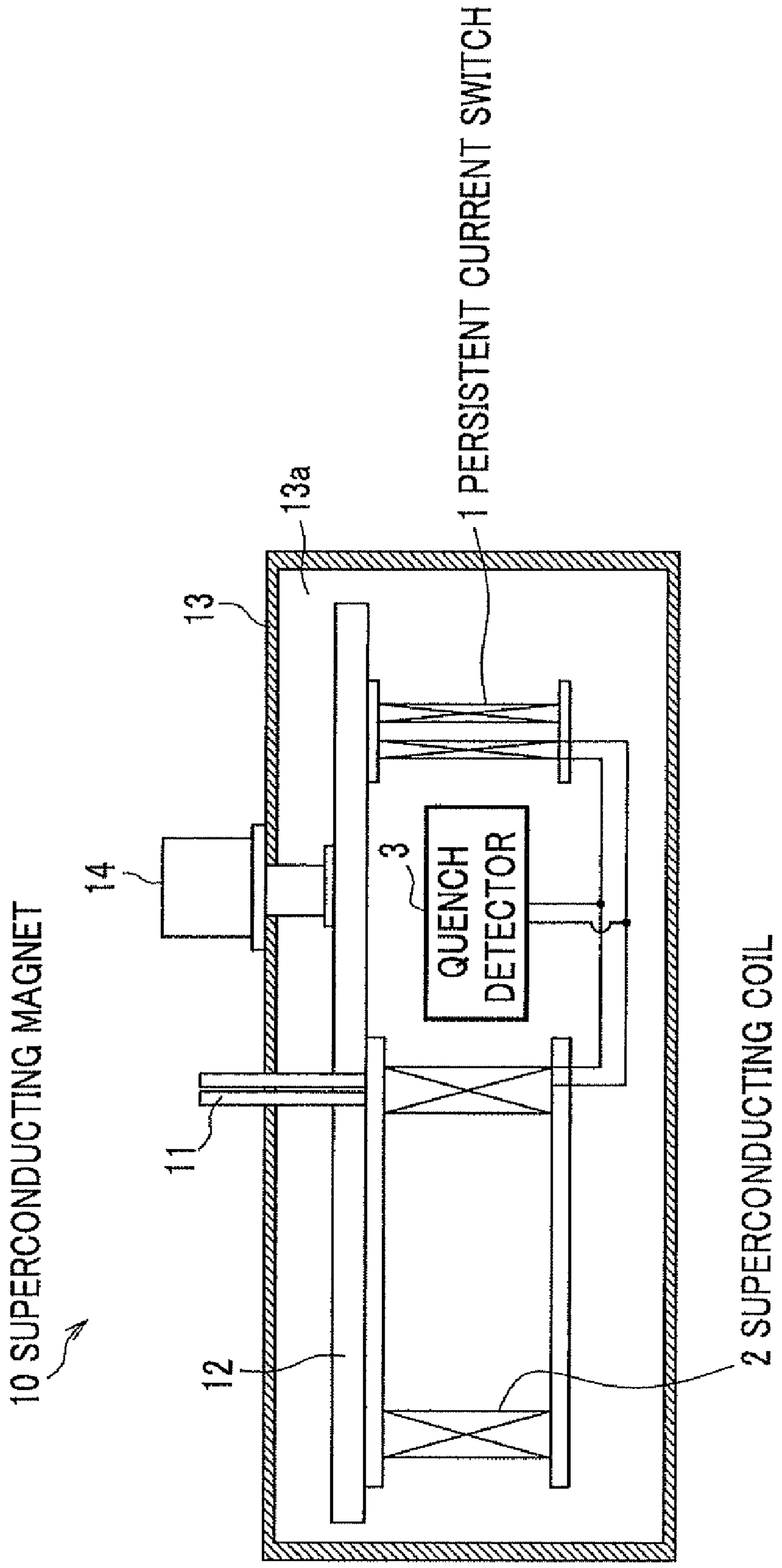
FIG. 1 is a schematic cross section view of a superconducting magnet according to first, to third embodiments of the present invention.

FIG. 1 is a schematic cross section of the superconducting magnet according to the first to third embodiments of the present invention.

The superconducting magnet 10 includes a persistent current switch 1, a superconducting coil 2, and a quench detector 3, current leads 11, a supporting board (solid heat conducting member) 12, a cryostat 13, and a refrigerator 14.

The persistent current switch 1 is connected to the superconducting coil 2 in parallel regarding an input of the superconducting magnet 10A. Current leads 11 connects the superconducting coil 2 via input terminals to an external power source (not shown) installed outside the cryostat 13.

There are two operation states of the superconducting magnet 10, i.e., a "driven mode" and a "persistent mode". The "driven mode" is an operation state of the superconducting magnet 10 of which the superconducting coil 2 is supplied with a current through current leads 11 from the external power source. The "persistent mode" is an operation of the superconducting magnet 10 such that a persistent current continuously flows through a closed circuit formed with a persistent current switch 1 and the superconducting coil 2 after the persistent current switch 1 becomes a superconducting state.

The superconducting coil 2 is formed with a superconducting wire which is wound around a bobbin to have a coil shape. The superconducting coil 2 will be described more specifically later with reference to FIG. 2.

The quench detector 3 detects occurrence of the quench at an initial stage by detecting a voltage generated in the superconducting coil 2. More specifically, a bridge voltage is detected from a resistor (not shown) connected in parallel to the superconducting coil 2 to detect the quench (voltage) of the superconducting coil 2.

The method of detecting the quench with the quench detector 3 is not limited to this, but any other quench detector using any other method of detecting the quench can be used.

The persistent current switch 1 and the superconducting coil 2 are supported by a supporting panel (solid thermal conduction member) 12 and are cooled by thermal conduction.

The persistent current switch 1, the superconducting coil 2, the quench detector 3, and the supporting panel 12 are housed in a cryostat 13.

The refrigerator 14 cools the supporting panel 12 in the cryostat 13 to cool the persistent current switch 1 and the superconducting coil 2 supported by the supporting panel 12. In other words, in the cryostat 13, there is no fluid coolant (free from fluid coolant), and the supporting panel (a solid heat conducting member) 12 thermally connected to the refrigerator 14, the superconducting coil 1, and the persistent current switch 1 in a vacuum space 13*a*.

In the embodiments, the superconducting magnet 10 is described as a thermal conduction cooling type of superconducting magnet in which the superconducting coil 2 and persistent current switch 1 are cooled by thermal conduction through a solid member with the refrigerator 14. However an immersion cooling type of superconducting magnet in which the superconducting coil 2 and persistent current switch 1 are cooled with a (fluid) coolant may be used.

The superconducting magnet 10 according to the embodiments, as described later, prevents the superconducting coil 2 from burning by forcibly spreading a quench area in the superconducting coil 2 for the quench protection when the quench occurs. Accordingly, it is necessary to expand an area in a normal state as broader as the circumstance allows. However, in the immersion cooling type of superconducting magnet, the superconducting coil 2 returns to the superconducting state because the superconducting coil 2 is surrounded by the coolant though the superconducting coil 2 is made forcibly quenched. In the thermal conduction cooling type, because the superconducting coil 2 is evacuated-insulated from surrounding and cooled by only thermal conduction through the supporting panel 2, the superconducting coil 2 does not return to the superconducting state once the superconducting coil 2 becomes in the normal state.

Therefore, preferably, the superconducting magnets 10 according to the first to third embodiments are of the thermal conduction cooling type.

<Quench Protection of Superconducting Coil>

As mentioned above, the quench protection method of heating the superconducting wire over a critical temperature by thermal conduction from the quench occurring part or from the heater to spread the quench area was difficult particularly in the superconducting magnet (superconducting coil) using a high temperature superconducting wire. In the superconducting coil 2 (superconducting magnet 10) according to the first to third embodiments, a method of spreading the quench area is used by conducting a current of which intensity exceeds that of a critical current through the superconducting coil 2. The present invention will be further described with the superconducting magnets according to the first to third embodiments.

First Embodiment

The superconducting magnet 10A (10) and the superconducting coil 2A (2) according to the first embodiment will be described with reference to FIG. 2. In the first embodiment, a current is supplied to the superconducting wire 21 by discharging a capacitor 24.

Figure 2:
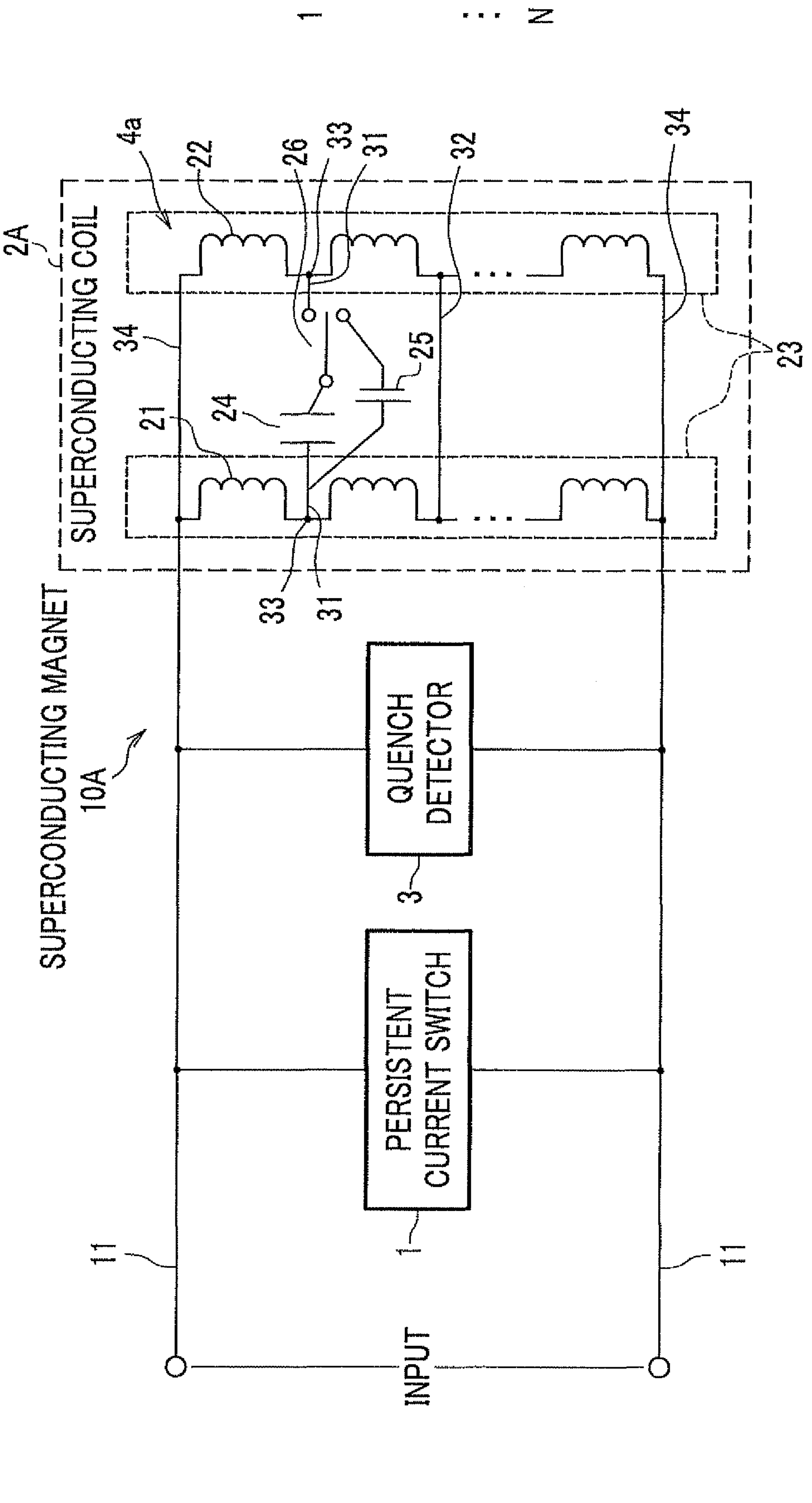
FIG. 2 is an equivalent circuit diagram of the superconducting magnet according to the first embodiment.

FIG. 2 is an equivalent circuit diagram of the superconducting magnet according to the first embodiment.

Two superconducting wires 21 and 22 are bundled and wound together as a parallel conductor (electrically-parallel-connection conductor) 23 on a bobbin in a coil state to form a superconducting coil 2A and electrically connected to an input of the superconducting magnet 10A in parallel. In other words, superconducting wires 21 and 22 has at least two connections 34 therebetween for parallel connection. Both ends of the superconducting coil 2A are respectively connected to the persistent current switch 1 and the quench detector 3 in parallel.

The superconducting coil 2A further includes a protection circuit 4*a* including a capacitor 24 and a DC power supply 25 for charging the capacitor 24, and a switch 26 for switching between charging and discharging the capacitor 24.

Regarding the capacitor 24, at least one capacitor 24 is connected between one and the other parallel conductor 23 at intermediate points 33 (connections between of the superconducting wires 21 and 22) to have a bridge circuit. When the number of the bridge circuits (N) is a natural number more than one, (N−1) of jumper 32 comprising a superconducting wire for connecting the superconducting wires 21 and 22 is added to form the bride circuit. Here, superconducting lines 31 (wires) are used for connecting the capacitor 24 and the switch 26 to the parallel conductor 23 (between superconducting wires 21 and 22).

The switch 26 comprises, for example, clysters to switch contact on the basis of the detection signal from the quench detector 3.

Next will be described an operation of the protection circuit.

Before excitation of the superconducting coil 2A, the switch 26 is turned so as to connect the DC power supply 25 to the capacitor 24 to previously charge the capacitor 24.

In a steady status (persistent mode operation), the persistent current continuously flows through the closed circuit formed with the persistent current switch 1 and the superconducting coil 2 and does not flow through the capacitor 24. However, in consideration of loss due to a leak current, it is necessary to properly charge the capacitor 24.

In quenching, when the quench detector 3 detects the quenching, connection of the switch 26 is switched to connect the capacitor 24 to the parallel conductor 23 (superconducting wires 21 and 22) to discharge the capacitor 24, so that a loop having a small inductance is formed to supply a large current (discharged current) to the superconducting wires 21 and 22 at a high speed.

The capacitor 24 as a current source connected to the superconducting wires of the parallel conductor supplies a current plying force and back between the superconducting wires 21, 22 of the parallel conductor 23 when a quench is detected.

<Protection Circuit Configuration and Current Variation in Operation>

Figure 3:
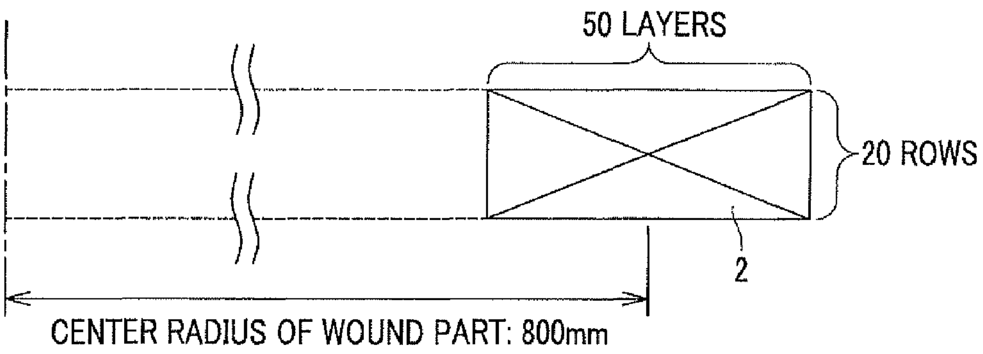
FIG. 3 is a schematic cross section view of the superconducting coil to be protected.

When the superconducting coil 2 shown in FIG. 3 is exemplified as a protection target, values regarding configuration of the protection circuit and a current variation in operation are evaluated.

FIG. 3 is a schematic cross section view of the superconducting coil to be protected.

The superconducting coil 2 as a protection target has a radius of a center of a wound part is 800 mm; the number of turns is 20 rows×50 layers=1000 turns; an inductance is 3.3 H; and an operation current is 800 A. The superconducting wires 21 and 22 have a circular cross sectional shape and a wire diameter is 2 mm. The superconducting coil 2 is formed by winding a parallel conductor including two superconducting wires 21 and 22.

The configuration of the superconducting wires are further explained with assumption that a current quantity necessary for increasing the current quantity over the critical current value to shift the superconducting wires 21 and 22 from a superconducting state to a normal state, is 1000 A.

An inductance of the parallel conductor 23 when a round current (plying current; go and return current) flows through the parallel conductor 23 formed with a pair of superconducting wires 21 and 22, is given by Eq. (1) as a sum of an internal inductance Li of the conductors and an external inductance Le.

$$L = L_i + L_e = \frac{\mu_0 l}{4\pi} + \frac{\mu_0 l}{\pi}\log\frac{d-a}{a} \tag{1}$$

In Eq. (1), $\mu_0$ is a magnetic permeability in vacuum=$4\pi\times10^{-7}$ [H/m], a center distance of the conductors=2.0 [mm], “a” is a radius of the conductor=0.6 [mm], and l is a length of the conductors. Accordingly, an inductance per a unit length is $4.4\times10^{-7}$ [H/m].

Figure 4:
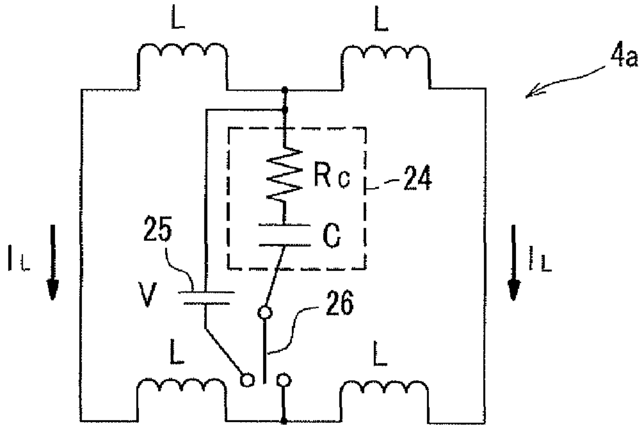
FIG. 4 is a circuit diagram of a protection circuit for a superconducting magnet according to the first embodiment.

In the superconducting coil 2 shown in FIG. 3, the capacitor 24 is connected to the parallel conductor 23 at points where entire lengths of the parallel conductor 23 are substantially equally divided into two parts to form a bridge (bridge circuit). FIG. 4 shows an equivalent circuit of this bridge circuit.

The bridge circuit shown in FIG. 4 serves as a protection circuit for the superconducting magnet. In FIG. 4, an internal resistor Rc of the capacitor 24 not shown in FIG. 2 is also shown.

In FIG. 4, L is an inductance of the superconducting coil 2, V is a voltage at completion of charging, C is a capacitance of the capacitor 24, and Rc is an internal resistor of the capacitor 24. The capacitor 24 as a current source connected to the superconducting wires 21 and 22 (see FIG. 2) of the parallel conductor 23 forms a loop together with the superconducting wires 21 and 22 via the switch 26.

In the circuit shown in FIG. 4, the capacitor is charged. After a sufficient time of charging elapsed, currents $I_L$ flowing when the connection in the switch 26 is switched to connect the capacitor 24 to the superconducting coil 2, is given in Eq. (2).

$$I_L = -\frac{V}{2\beta L}e^{-\frac{R_C}{2L}t}\sin\beta t \quad (2)$$

β in Eq. (2) is given by Eq. (3).

$$\beta = \sqrt{\frac{1}{LC} - \left(\frac{R_C}{2L}\right)^2} \quad (3)$$

In Eq. (3), L=5.5×10$^{-4}$ [H] which is determined as a specification of the superconducting coil 2.

Figure 5:
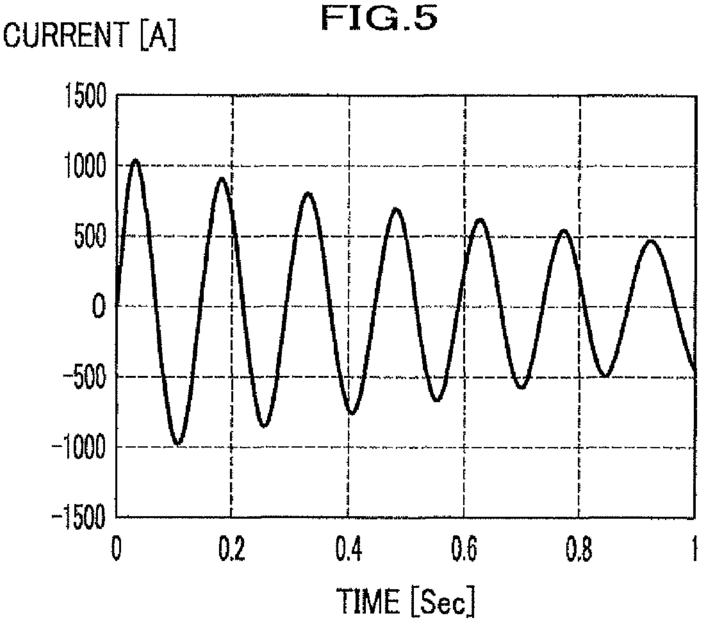
FIG. 5 is a chart of current variation during discharging of a capacitor for the superconducting magnet according to the first embodiment.

When C=1.0 [F], Rc=1 [mΩ], V=50 [V], a variation in time of $I_L$ is shown in FIG. 5.

FIG. 5 is a chart of current variation during discharging of a capacitor for the superconducting magnet according to the first embodiment.

As shown in this chart, it can be understood that a large current of 1000 A, can be supplied rapidly in a short time period of about 40 msec.

The DC power supply 25 necessary for charging the capacitor 24 may be either of a voltage source type or a current source type. However, in consideration of efficiency in charging, a current source type of DC power supply is more desirable. In the calculation described above, an electricity quantity Q of the capacitor 24=CV=50 [C]. When the DC power supply 25 can supply an output of 1 A, charging time is 50 [sec]. If the DC power supply has a capacity of supplying a large current, the charging time can be shortened in accordance with the output current capacity.

The capacitor 24 connected to the parallel conductor as the bridge circuit should have a large capacitance. A chemical capacitor or an electric double layer capacitor can be used as the capacitor 24.

Because the chemical capacitor has a capacitor of several milli-farads at the maximum, the chemical capacitor should have a high withstand voltage of hundreds volts or more to supply the current of 1000 A.

Accordingly the electric double layer capacitor, having a greater capacitance (up to thousands Farads) is more preferable to the chemical capacitor. Because the electric double layer capacitor has a withstand voltage around several volts, it is preferable to use a plurality of electric double layer capacitors connected in series.

<Advantageous Effect>

Because the superconducting coil 2 capable of a high magnetic field has a large inductance, generally, it was difficult to vary the current rapidly.

The superconducting magnet 10A (superconducting coil 2A) according to the first embodiment can supply the current of which intensity is greater than the critical current, so that the quench area can be extended over the whole of the superconducting coil 2A to prevent the superconducting coil 2A from burning due to a local temperature increase. Particularly, because the capacitor 24 is charged in the steady state (before occurrence of quench) and discharged when the quench occurs by switching the switch 26 to supply a large current, the superconducting magnet according to the first embodiment can supply rapidly a current greater than the critical current in intensity even if the DC voltage supply having a small current capacity is used. As the capacitor 24, it is preferable to use the chemical capacitor having a large capacitance or an electric double layer capacitor.

In addition, the superconducting magnet 2 according to the first embodiment can prevent the superconducting coil from burning due to a local temperature increase by spreading the quench area over the whole of the superconducting coil 2A though a high temperature superconducting wire comprising any one of magnesium diboride, an oxide including bismuth, and an oxide including yttrium or a high temperature superconducting wire comprising a compound selected from the group consisting of magnesium diboride, oxide including bismuth, and oxide including yttrium.

Second Embodiment

A superconducting magnet 10B (10) and a superconducting coil 2B (2) according to a second embodiment will be described. In the second embodiment, an LC resonating circuit including an inductance L and a capacitance C is used to supply the current to the superconducting wires 21 and 22 in response to detection of the quench.

Figure 6:
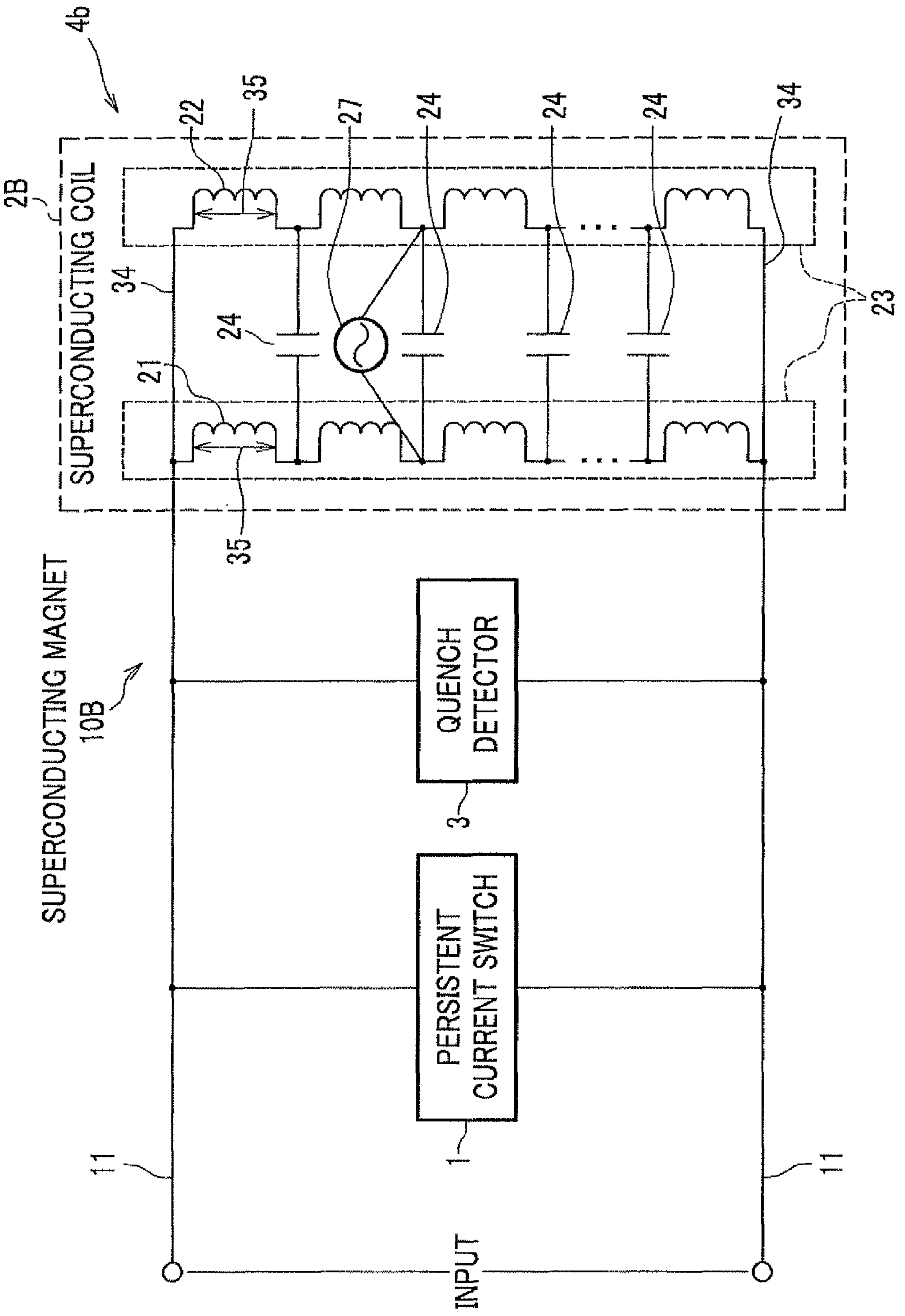
FIG. 6 is an equivalent circuit diagram of the superconducting magnet according to the second embodiment.

FIG. 6 is an equivalent circuit of the superconducting magnet according to the second embodiment.

Two superconducting wires 21 and 22 are bundled as a parallel conductor 23 and wound together around a bobbin in a coil to form the superconducting coil 2B.

Both ends of the superconducting coil 2B are connected to the persistent current switch 1 and the quench detector 3.

The superconducting coil 2B has a protection circuit 4*b* including capacitors 24 and an AC voltage supply 27.

At least one capacitor 24 is connected to the parallel conductor 23 (the intermediate points 33 of the superconducting wires 21, 21) of the superconducting coil 2B such that the superconducting wires 21, 21 are bridged to have divided parts 35.

The AC voltage supply 27 is connected in parallel to the capacitor 24.

Next an operation of the protection circuit 4*b* will be described. When the quench detector 3 detects occurrence of the quench, the quench detector 3 turns on the AC voltage supply 27 to apply an AC voltage to the capacitor 24. When the inductance L of the bridged divided parts 35 of the superconducting coil 2 and the capacitance of the capacitor 24 are suitably designed to have an LC resonating circuit, a large current can be supplied to the superconducting coil 2B.

<Protection Circuit Configuration and Current Variation in Operation>

Similar to the first embodiment, the superconducting coil 2 shown in FIG. 3 is protected and an interval of bridging (bridge part) is two layers (the parallel conductor 23 is connected to the capacitor every two layers of the superconducting coil 2. A current variation is calculated in a single loop as shown in FIG. 7.

Figure 7:
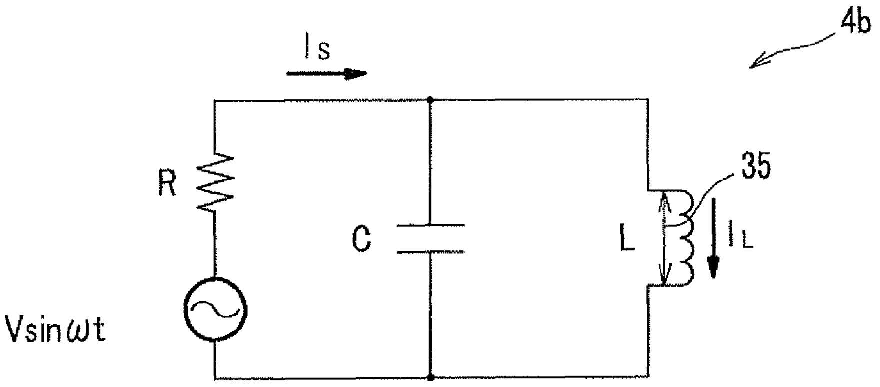
FIG. 7 is a circuit diagram of a protection circuit for the superconducting magnet according to the second embodiment.

FIG. 7 is the protection circuit of the superconducting magnet according to the second embodiment.

In FIG. 7, V is an amplitude of the AC voltage to be applied to the circuit, and R is an internal resistance of the AC voltage supply 27.

The current $I_L$ flowing through the L at a resonating (at a frequency of (½π(LC)$^{0.5}$) is given by Eq. (4) and a time constant until peak values of the current saturate is 2RC.

$$I_L = -\sqrt{\frac{C}{L}}V_0\cos\omega t \quad (4)$$

In this circuit, will be considered a case where a current of 100 A is supplied with the voltage source having V=100 [V] and R=1.0 [Ω].

First, a value of the inductance is determined as follows: When the parallel conductor 23 are bridged every two layers, $L=4.4\times10^{-5}$ [H]. The value of the capacitance providing the peak value of 1000 [A] at the resonation is 4.4 mF and the resonating frequency is 362 Hz.

Figure 8:
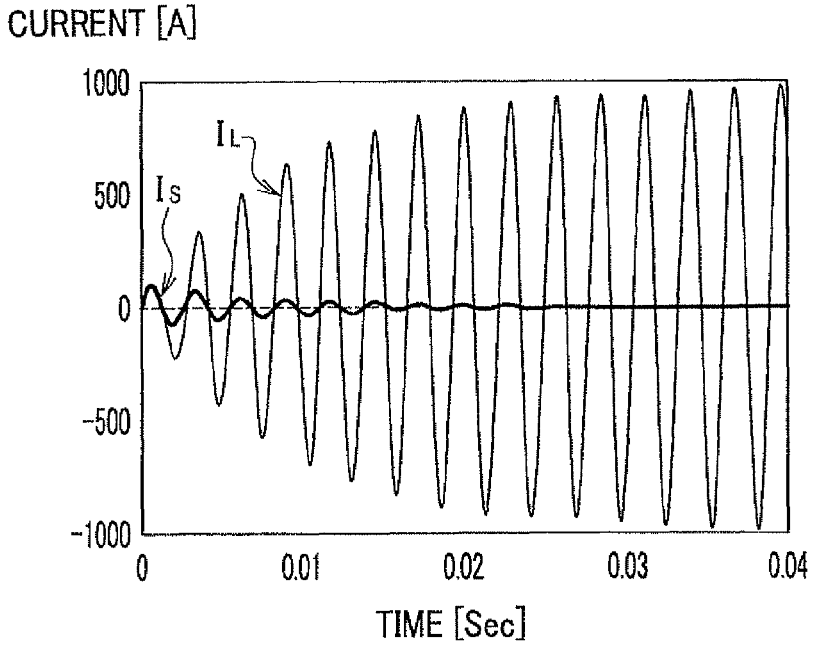
FIG. 8 is a chart of current variation during discharging of a capacitor for the superconducting magnet according to the second embodiment.

FIG. 8 shows the variation of the current flowing through the L and the current Is flowing from the AC voltage source 27.

FIG. 8 is a chart of current variation during discharging of a capacitor for the superconducting magnet according to the second embodiment.

As shown in FIG. 8, it was confirmed that a large current of about 1000 A can be supplied rapidly within about 30 msec. A maximum value of the current flowing from the AC voltage source 27 is approximately 100 A.

When the inductance L of the coil to be protected is larger, the capacitance C necessary for resonation become larger. Accordingly, the time constant (2RC) corresponding to a time period until resonation reaches saturation becomes long. When the internal resistance R of the AC voltage source 27 is decreased, the time constant can be shortened. In this case, it is necessary to increase a capacitor of the AC voltage source 27, because the current Is flowing from the AC voltage source 27 becomes large in a transition state where the resonation has grown.

<Advantageous Effect>

According to the superconducting magnet 10B (superconducting coil 2B) according to the second embodiment, it is possible to rapidly supply the current of which intensity exceeds that of the critical current to the superconducting coil 2B, so that the quench area can be spread over the whole of the superconducting coil 2B to protect the superconducting coil 2B from burning due to local temperature increase.

In addition, the superconducting magnet 2 according to the second embodiment can prevent the superconducting coil 2B from burning due to the local temperature increase by spreading the quench area over the whole of the superconducting coil 2B though the high temperature superconducting wire comprising a compound selected from the group consisting of magnesium diboride, an oxide including bismuth, and an oxide including yttrium, or a high temperature superconducting wire comprising any one of magnesium diboride, an oxide including bismuth, and an oxide including yttrium, is used.

Third Embodiment

A superconducting magnet 10C (10) and a superconducting coil 2C (2) according to a third embodiment will be described.

Figure 9:
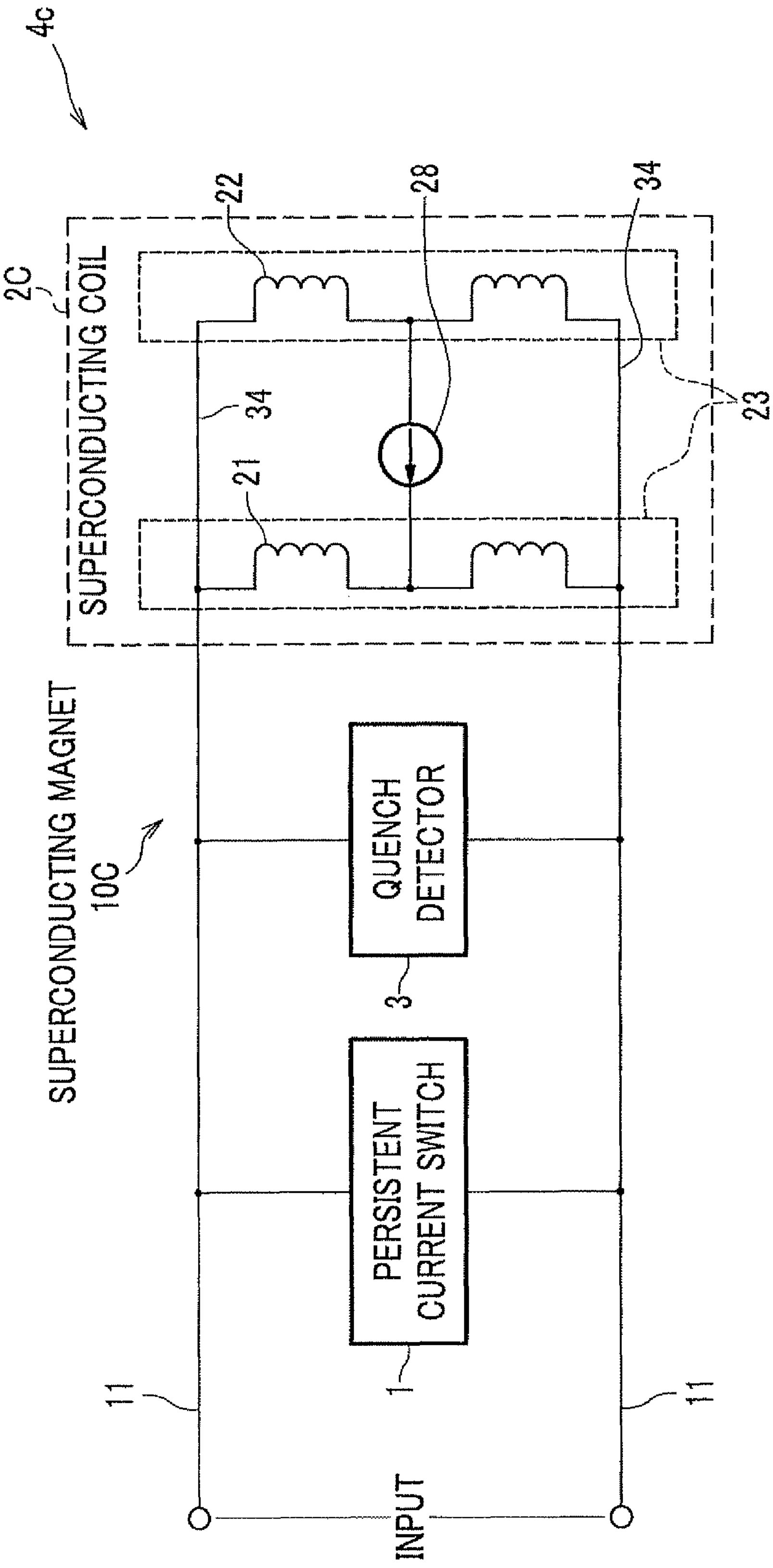
FIG. 9 is an equivalent circuit diagram of the superconducting magnet according to the third embodiment.

FIG. 9 is an equivalent circuit of the superconducting magnet according to the third embodiment.

Two superconducting wires 21 and 22 are bundled as a parallel conductor 23 and wound together around the bobbin in the coil to form the superconducting coil 2C.

Both ends of the superconducting coil 2C are connected to the persistent current switch 1 and the quench detector 3 and have connections 34.

The superconducting coil 2C has a protection circuit 4*c* including a current source 28. The current source 28 supplies a current on the basis of the detection signal of the quench detector 3. The current source 28 has a large capacity to rapidly supply a large intensity of the current.

<Advantageous Effect>

According to the superconducting magnet 10C (superconducting coil 2B) according to the third embodiment, it is possible to rapidly supply the current of which intensity exceeds that of the critical current to the superconducting coil 2C, so that the quench area can be spread over the whole of the superconducting coil 2C to protect the superconducting coil 2C from burning due to the local temperature increase.

In addition, the superconducting magnet 2 according to the third embodiment can prevent the superconducting coil 2C from burning due to the local temperature increase by spreading the quench area over the whole of the superconducting coil 2C though the high temperature superconductor comprising magnesium diboride, an oxide including bismuth, or an oxide including yttrium, is used.

CONCLUSION

As mentioned above, the superconducting magnet and the superconducting coil according to the first to third embodiments have been described. When comparison is made among the DC voltage source 25, the AC voltage source 27, and the current source 28, the first embodiment is more preferable to the second and the third embodiment because a simple structure can supply rapidly a large intensity current.

The present invention is not limited to the configurations of the superconducting magnets and the superconducting coils according to the first to the third embodiments, but may be modified without departure from the subject matter of the present invention.

For example, the number of the superconducting wires of the parallel conductor is two. However, this may be more than this, as far as the return current can flow. In consideration of winding the superconducting material in manufacturing, the number having a lower value is more preferable because it is easy to wind the superconducting wires.

In addition, the superconducting wire wound as the superconducting coil is not limited to the high temperature superconducting wire, but this invention is also applicable to superconducting magnets and superconducting coil using a low temperature superconducting wire.

As mentioned above, there is provided a superconducting coil including: a parallel conductor comprising a plurality of superconducting wires bundled and wound in a coil; and a current source connected to the superconducting wires of the parallel conductor so as to supply a current plying forth and back between the superconducting wires of the parallel conductor when a quench is detected. In addition, there is provided a superconducting coil including: a plurality of superconducting wires bundled as a parallel conductor and wound in a coil, the superconducting wires having at least two connections therebetween for parallel connection; and a current source connected to intermediate points of the superconducting wires between the connections to have loops via the superconducting wires and the connections to supply current in the loops when a quench is detected.

The invention claimed is:

1. A superconducting coil comprising:

a plurality of superconducting wires bundled as a parallel conductor and wound in a coil, the superconducting wires having at least two connections therebetween for parallel connection; and a current source connected to intermediate points of the superconducting wires to have loops via the superconducting wires and the connections to supply current in the loops when a quench is detected.

2. The superconducting coil as claimed in claim 1, wherein the current source comprises:

a capacitor connectable to the superconducting wires to form the loop;

a power source device configured to charge the capacitor; and a switch configured to switch connection for charging the capacitor and discharging the capacitor to supply the current in the loop.

3. The superconducting coil as claimed in claim 1, wherein the current source comprises a capacitor connected to the superconducting wires to form the loop; and an AC voltage source device configured to charge the capacitor.

4. The superconducting coil as claimed in claim 2, wherein the capacitor comprises a device selected from a group consisting of a chemical capacitor and a double layer capacitor.

5. The superconducting coil as claimed in claim 2, further comprising superconducting lines, wherein the capacitor is connected to the superconducting wires with the superconducting lines via the switch.

6. The superconducting coil as claimed in claim 1, wherein the superconducting wire comprises any one of magnesium diboride, an oxide including bismuth, or an oxide including yttrium.

7. A superconducting magnet including the superconducting coil as claimed in claim 1, comprising:

a persistent current switch connected to the superconducting coil; and a quench detector configured to detect quench occurring in the superconducting coil.

8. A superconducting magnet including the superconducting coil as claimed in claim 1, further comprising:

a refrigerator; and a solid heat conducting member thermally connected to the refrigerator, the superconducting coil, and the persistent current switch in a vacuum space to cool the superconducting coil and the persistent current switch.

9. A method of operating a superconducting magnet including:

the superconducting coil as claimed in claim 2;

a persistent current switch connected to the superconducting coil; and a quench detector configured to detect quench occurring in the superconducting coil, the method comprising the steps of:

charging the capacitor in a steady condition; and discharging the capacitor to supply a discharge current to the superconducting coil when the quench is detected.

10. A method of operating a superconducting magnet including:

the superconducting coil as claimed in claim 3;

a persistent current switch connected to the superconducting coil; and a quench detector configured to detect quench occurring in the superconducting coil, the method comprising the steps of:

detecting the quench with the quench detector; and turning on the AC voltage source device when the quench is detected.

11. The superconducting coil as claimed in claim 3, wherein the capacitor comprises a device selected from a group consisting of a chemical capacitor and a double layer capacitor.

12. The superconducting coil as claimed in claim 3, wherein the capacitor is connected to the superconducting wires with superconducting material lines.

* * * * *